United States Patent
Andoh et al.

(10) Patent No.: US 7,833,679 B2
(45) Date of Patent: Nov. 16, 2010

(54) FUEL CARTRIDGE AND DIRECT METHANOL FUEL CELL DEVICE

(75) Inventors: Shinsuke Andoh, Hitachi (JP); Ken Takahashi, Sagamihara (JP); Osamu Kubota, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1412 days.

(21) Appl. No.: 11/206,949

(22) Filed: Aug. 19, 2005

(65) Prior Publication Data

US 2006/0078769 A1    Apr. 13, 2006

(30) Foreign Application Priority Data

Oct. 8, 2004    (JP) .............................. 2004-295815

(51) Int. Cl.
  *H01M 8/04*  (2006.01)
  *H01M 8/02*  (2006.01)
(52) U.S. Cl. ...................... 429/513; 429/456; 429/466; 429/512
(58) Field of Classification Search ........................ None
See application file for complete search history.

(56) References Cited

U.S. PATENT DOCUMENTS 6,924,054 B2    8/2005  Prasad et al.
7,645,536 B2    1/2010  Akiyama et al.
2008/0193823 A1  8/2008  Kanno

FOREIGN PATENT DOCUMENTS

| JP | 2003-45468 | | 2/2003 |
| JP | 2003-045468 | * | 2/2003 |
| JP | 2003-142135 | | 5/2003 |
| JP | 2006-54055 | | 2/2006 |
| WO | WO 2005-057703 | | 6/2005 |

OTHER PUBLICATIONS

Office Action issued in Japanese Patent Application No. 2004-295815 on Aug. 3, 2010.

* cited by examiner

*Primary Examiner*—Dah-Wei Yuan
*Assistant Examiner*—Angela J. Martin
(74) *Attorney, Agent, or Firm*—Antonelli, Terry, Stout & Kraus, LLP.

(57) ABSTRACT

A fuel cell device comprising a fuel cell cartridge having a container for containing methanol mixed solution fuel and a direct methanol fuel cell on which the fuel cartridge is set the fuel cartridge being provided with a fuel injection nozzle on part of the container and a projection disposed around the fuel injection nozzle; the size of which is determined according to the concentration of methanol of the fuel in the container, and the direct methanol fuel cell being provided with a concavity, which is designed to engage with the projection of the fuel cartridge at a portion where the fuel cartridge is to be set when the concentration of methanol is proper.

3 Claims, 7 Drawing Sheets

FUEL CARTRIDGE AND DIRECT METHANOL FUEL CELL DEVICE

CLAIM OF PRIORITY

THIS APPLICATION CLAIMS PRIORITY FROM JAPANESE APPLICATION SERIAL NO. 2004-295815, FILED ON OCT. 8, 2004, THE CONTENT OF WHICH IS HEREBY INCORPORATED BY REFERENCE INTO THIS APPLICATION.

BACKGROUND OF THE INVENTION

1. Field of the Invention

The present invention relates to a fuel cell device comprising a fuel cartridge that contains methanol mixed solution fuel such as methanol water solution and a direct methanol fuel cell on which the fuel cartridge is set, and also to the fuel cartridge and a fuel cell.

2. Related Art

Thanks to the advancement in the latest electronic technology, telephones, notebook type personal computers, audio/visual devices, mobile terminals, and some others have been made compact and accordingly become very much popular as handy electronic devices. A fuel cell power supply is regarded as a power supply for these handy electronic devices. Since the fuel cell converts electro-chemically the chemical energy contained in the fuel directly into electric energy, it does not require any power drive needed for a generator, which is normally employed in an internal combustion engine, such as an ordinary engine generator. Accordingly, possibility of realization of a small generation device by using the fuel cell is very high. In addition, since the fuel cell continues generation as long as the fuel is supplied, it is no longer necessary to stop operating a device including a load temporarily for charging as is needed in using general secondary batteries.

For a generally known type of the fuel cell, hydrogen generated by reforming the city gas is used as fuel. While the operating temperature of the fuel of this type is higher than 80° C., there are available fuel cells that operate at a room temperature, one of which is a type that oxidizes liquid fuel directly on the fuel electrode of a fuel cell. A direct methanol fuel cell (DMFC) is a typical one, which directly oxidizes methanol.

A method of supplying fuel to the fuel cell is, for example, to fill a fuel cartridge with the fuel for generation and set the fuel cartridge on the fuel cell so that the fuel for generation is supplied from the fuel cartridge to the fuel cell. (See the Patent Document 1, for example)

[Patent Document 1] Japanese Application Patent Laid-open Publication No. 2003-45468 (Summary)

As the fuel for the direct methanol fuel cell, a mixed solution of methanol and pure water has been studied. The concentration of methanol in the mixed solution has a proper range depending upon the characteristics of the fuel cell and, if the fuel having the concentration greatly out of the proper range is supplied, the fuel cell does not satisfactory output performance and, furthermore, it may possibly give adverse effect on the members constituting the fuel cell. Accordingly, it becomes necessary in connecting the fuel cell cartridge with the fuel cell to check whether the fuel contained in the fuel cartridge is proper one for the fuel cell.

SUMMARY OF THE INVENTION

An object of the present invention is to offer a direct methanol fuel cell wherein the fuel contained in the fuel cartridge is judged as proper whether to be supplied to the fuel cell when it is proper one, and also to offer a fuel cartridge and the fuel cell.

The direct methanol fuel cell device of the present invention is equipped with a fuel cartridge provided with a fuel injection nozzle on part of the container containing the methanol mixed solution fuel and a projection having a size determined according to the concentration of methanol of the fuel in the container, disposed around the nozzle, and a direct methanol fuel cell provided with a concavity with which the projection engages when the concentration of methanol is proper, at a portion the fuel cartridge is to be set. In addition, electric contacts are provided on both the fuel cartridge and the fuel cell and the fuel is supplied from the fuel cartridge to the fuel cell when the two electric contacts get in touch.

DETAILED DESCRIPTION OF THE INVENTION

Description of the Preferred Embodiment

Preferred embodiments are described hereunder but the present invention is not limited thereto.

Figure 1:
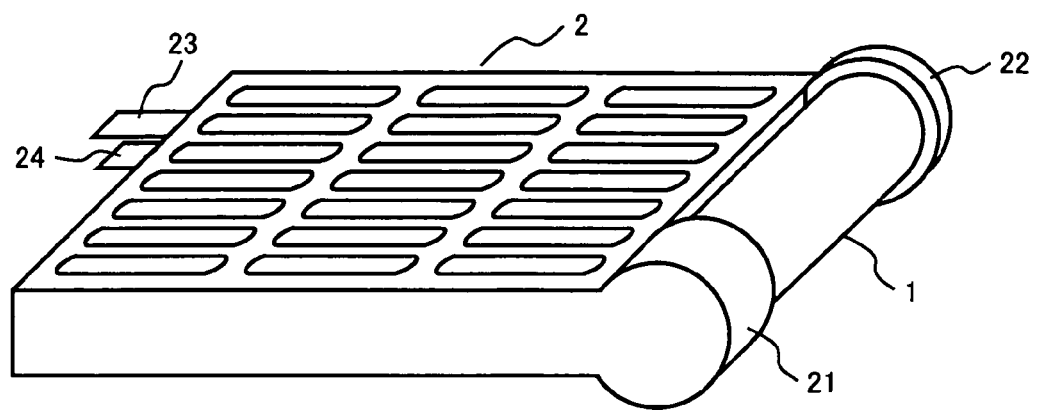
FIG. 1 A perspective view of a fuel cell device showing a fuel cartridge set on a fuel cell.
Figure 2:
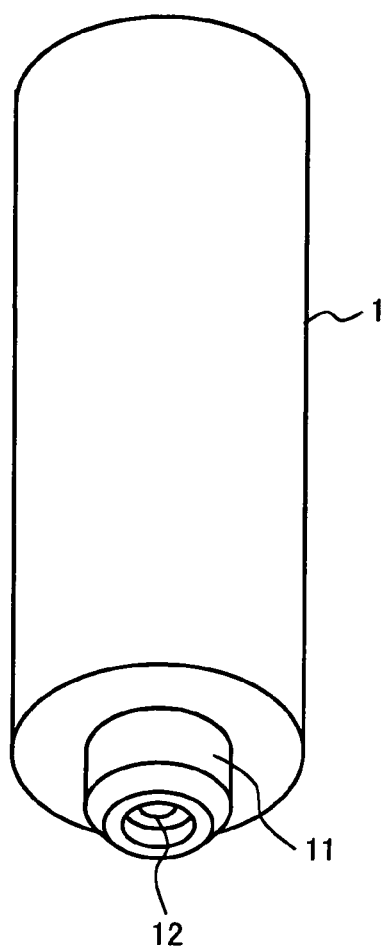
FIG. 2 A perspective view showing a general construction of the fuel cartridge.

The fuel cartridge and the fuel cell of the fuel cartridge setting type are described hereunder, using FIG. 1 to FIG. 3. In FIG. 1 to FIG. 3, the fuel cartridge is not provided with a projection and the fuel cell is not provided with a concavity for engaging with the projection.

FIG. 1 shows the fuel cartridge 1 set on the fuel cell 2 to be installed in a notebook type personal computer and other devices. The fuel cartridge 1 is inserted into a cartridge receiver 21 of the fuel cell 2, and when being set, it is fastened by a cartridge stopper 22 mounted on the fuel cell 2. The fuel cell 2 has DC terminals 23 and 24 for electrical connection with devices and supplying power.

The fuel cartridge 1 is an enclosed container for containing liquid fuel to be supplied to the fuel cell as shown in FIG. 2. The fuel cartridge 1 has a connection port 11 that connects with the fuel cell 2 and serves as a fuel supply port when inserted into the cartridge receiver 21 of the fuel cell 2, and the connection port 11 is equipped with a valve 12 inside.

The fuel cartridge 1 is connected with the fuel cell 2 as is explained hereunder, using a cross-sectional views in FIG. 3.

Figure 3A:
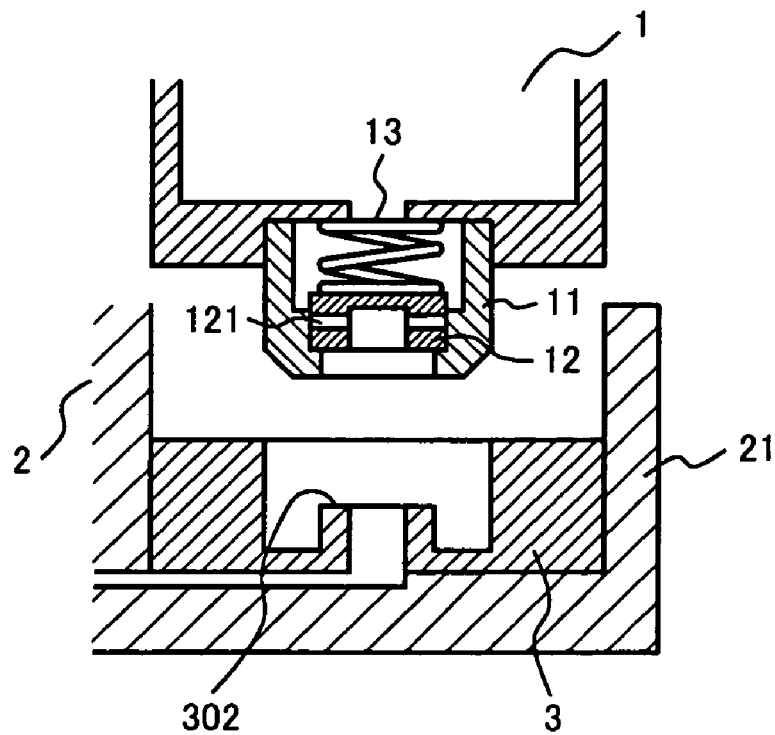
FIGS. 3a and 3b Figure showing the connection between the fuel cell and the fuel cartridge.

As shown in FIG. 3(a), the valve 12 inside the connection port 11 is a check device to open or close the flow of liquid fuel, and is depressed towards the outlet of the connection port 11 by a compression coil spring 13. The through hole 121 continuing from the center hollow portion to the side of the valve 12 is closed under this condition, and so the liquid fuel contained in the fuel cartridge 1 will not flow out of the container. On the other hand, the cartridge receiver 21 of the fuel cell 2 is equipped with a connection piece 3 inside and a projection piece 302 having a through hole is provided at the center of the connection piece 3. This through hole serves as the receiving port when supplying the liquid fuel to the fuel cell 2 via the flow path inside the cartridge receiver 21.

Figure 3B:
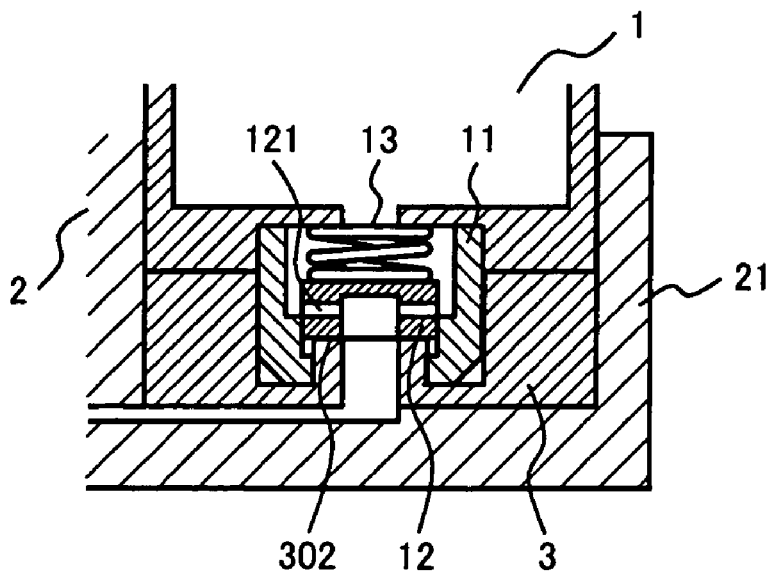

When the fuel cartridge 1 is inserted deeply into the cartridge receiver 21 of the fuel cell 2 as shown in FIG. 3(b), the connection port 11 of the fuel cartridge 1 is inserted into the connection piece 3 of the fuel cell 2, and so the valve 12 is pushed towards the inside of the fuel cartridge 1 by the projection piece 302. When this is complete, the through hole 121 is made open to the hollow portion of the connection port 11 and the liquid fuel in the fuel cartridge 1 can be supplied to the fuel cell via the hollow portion of the connection port 11, the through hole 121, the center hollow portion of the valve 12, the through hole of the connection piece 3 of the fuel cell 2 and a flow path of the cartridge receiver 21.

When the fuel cartridge 1 is pulled out of the cartridge receiver 21 of the fuel cell 2, the connection port 11 is pushed back to the original position as shown in FIG. 3(a) by the action of the compression coil spring 13, and the through hole 121 is closed.

In the above construction, gaskets (not shown) are installed wherever necessary so as to prevent fuel leakage from the fuel cartridge 1 or from any gap through the connection between the fuel cartridge 1 and the fuel cell 2.

On the fuel cartridge 1, it is permissible to install a mechanism for pressurizing the contained liquid fuel from inside to inject the fuel through the connection port 11 to the fuel cell 2.

With the construction shown in FIG. 1 to FIG. 3, assuming that the liquid fuel used on the fuel cell 2 is mixed solution of methanol and pure water and that 30%, for example, is the proper concentration of methanol for the fuel cell and for achieving the highest fuel cell output, a fuel cartridge containing liquid fuel of different concentrations can also be set.

EMBODIMENT 1

A fuel cartridge and a cartridge receiver of fuel cell according to the first embodiment of the present invention are described hereunder, using FIG. 4 to FIG. 8. The same parts/component as in FIG. 1 to FIG. 3 is given the same symbol, and no further explanation is made.

Figure 4:
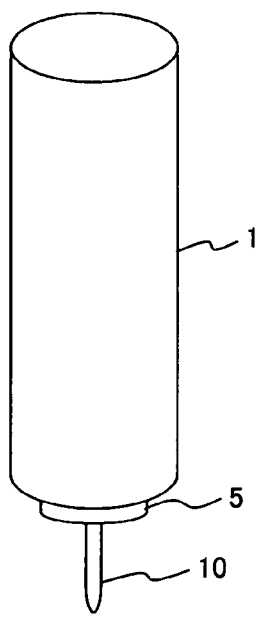
FIG. 4 A perspective view of the fuel cartridge according to the first embodiment of the present invention.
Figure 5A:
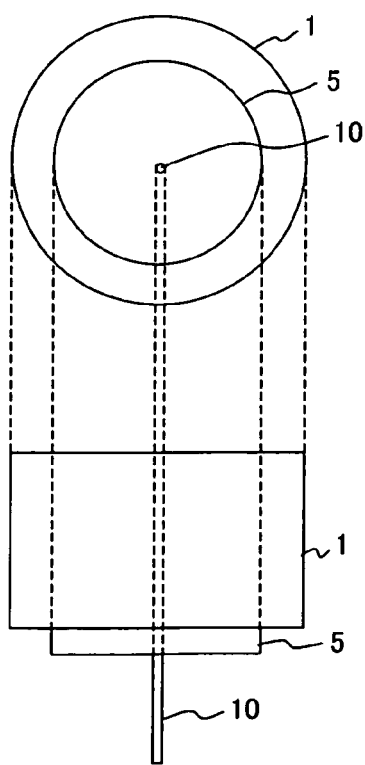
FIGS. 5a, 5b and 5c Figure showing the top and side views of the fuel cartridge according to the first embodiment of the present invention.
Figure 5B:
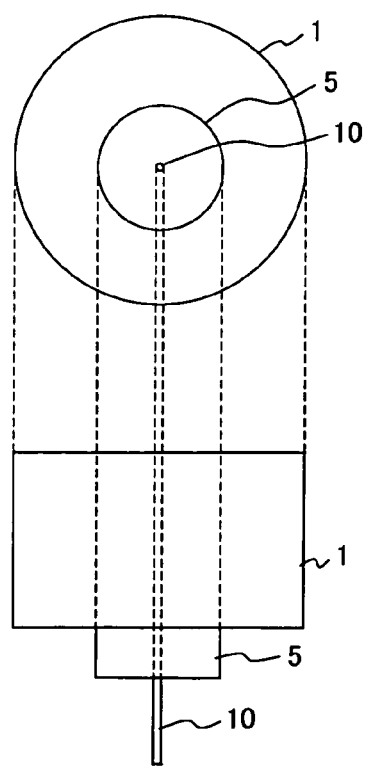
Figure 5C:
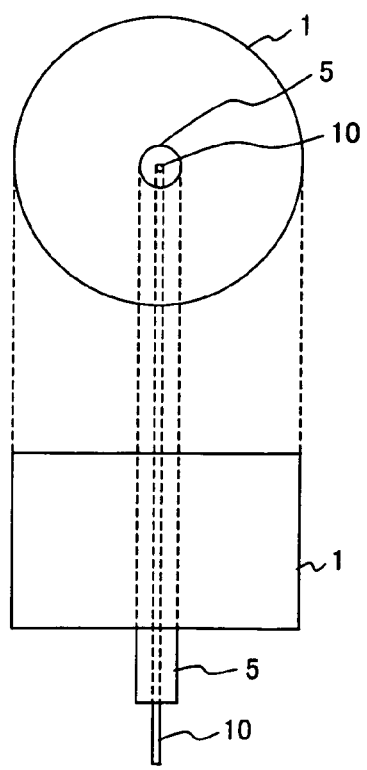

FIG. 4 and FIG. 5 show each example of the fuel cartridge. FIG. 4 is an oblique view of the outline of the fuel cartridge. A fuel injection nozzle 10 is provided on the bottom of the fuel cartridge 1 and a projection 5, of which size has been determined according to the concentration of methanol of the fuel in the cartridge, is provided where the nozzle is mounted. FIG. 5(a) to (c) are some examples of the fuel cartridges of different concentrations of methanol. FIG. 5(a) to (c) shows each plan view and side view of the portion the fuel injection nozzle is mounted. FIG. 5(a) is for high concentration of methanol, FIG. 5(c) is for low concentration of methanol, and FIG. 5(b) is for intermediate concentration of methanol between FIG. 5(a) and FIG. 5(c). Comparing FIG. 5(a) to (c), the projection 5 is the widest and shortest in FIG. 5(a) for high concentration of methanol. The projection 5 is the narrowest and longest in FIG. 5(c) for low concentration of methanol. In FIG. 5(b) for intermediate concentration of methanol between the two, both width and length of the projection 5 are intermediate between the two.

Figure 6:
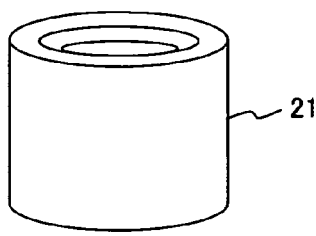
FIG. 6 A perspective view showing the cartridge receiver on the fuel cell side according to the first embodiment of the present invention.
Figure 7A:
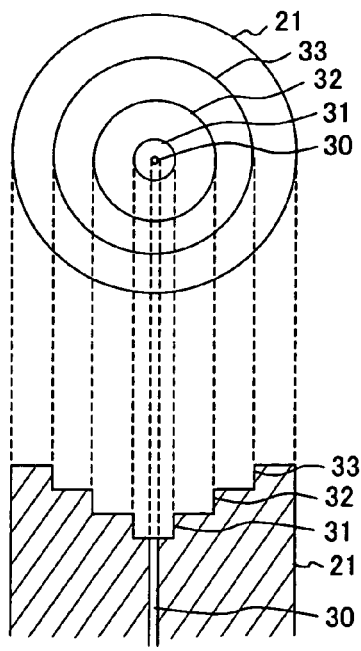
FIGS. 7a, 7b and 7c Figure showing the plan and side views of the cartridge receiver according to the first embodiment of the present invention.
Figure 7B:
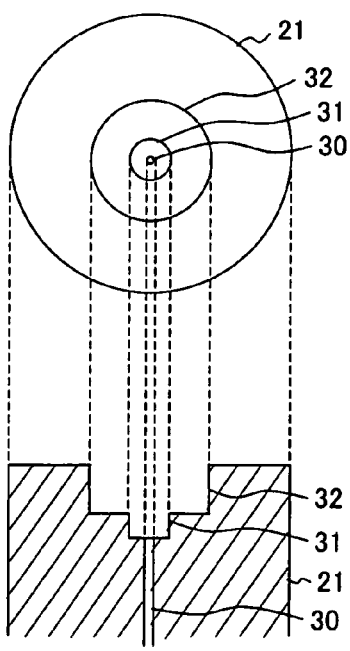
Figure 7C:
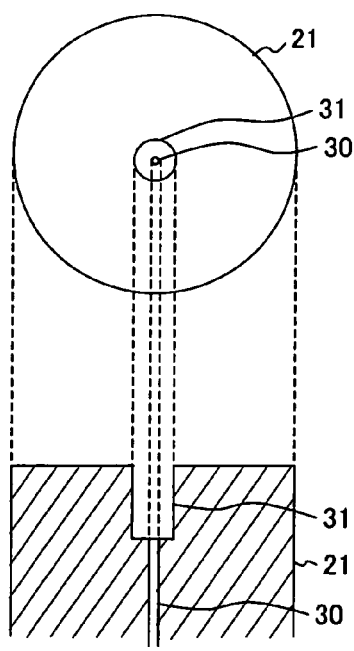

FIG. 6 is an oblique view showing the cartridge receiver 21 of the fuel cell typically. FIGS. 7(a) to (c) are examples of the cartridge receiver, showing each plan view and side view. FIG. 7(a) is so designed that any cartridge having different concentration of methanol from low to high can be set, where the concavities 31, 32 and 33 are made in steps so that any one of the projections 5 of the fuel cartridge shown in FIG. 5(a) to (c) can engage with. FIG. 7(b) is so designed that a cartridge having the concentration of methanol from low to intermediate can be set, where the concavities 31 and 32 are made in steps so that only the projections 5 of the fuel cartridge shown in FIGS. 5(b) and (c) can engage with. In addition, FIG. 7(c) is so designed that only a cartridge of low concentration of methanol can be set, where the concavity 31 is provided so that only the projection 5 of the fuel cartridge shown in FIG. 5(c) can engage with. A through hole 30 is provided at the center of the concavity of the cartridge receiver 21 so that the fuel injection nozzle 10 of the fuel cartridge is inserted. The fuel contained in the fuel cartridge is supplied to the fuel cell via this through hole 30.

Figure 8A:
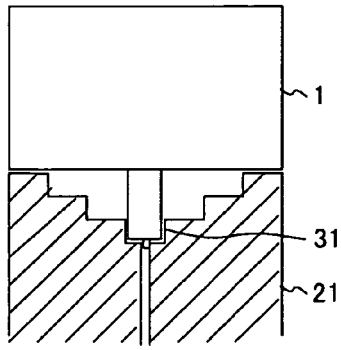
FIGS. 8a, 8b and 8c Side sectional views of the fuel cartridge set on the cartridge receiver shown in FIG. 7(a).
Figure 8B:
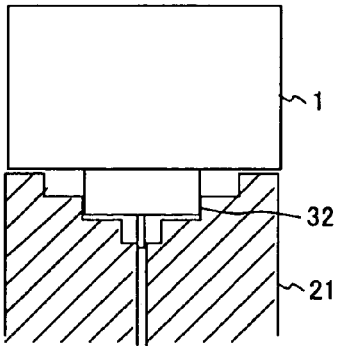
Figure 8C:
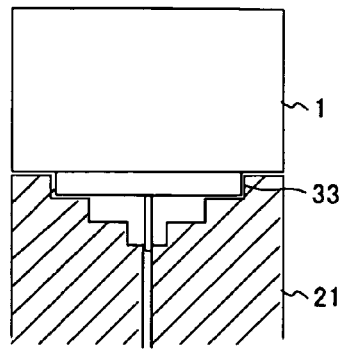

How the fuel cartridge shown in FIG. 5(a) to (c) is set on the cartridge receiver with the stepped concavity shown in FIG. 7(a) is explained hereunder, using FIG. 8(a) to (c). On the cartridge receiver 21 shown in FIG. 7(a), concavities are made in steps so as to be applicable to fuel cartridges of different concentration of methanol from low to high. The fuel cartridge constructed as in FIG. 5(c) can engage with the center concavity of the cartridge receiver as shown in FIG. 8(a), and so can be set there. The fuel cartridge constructed as in FIG. 5(b) can also engage with the concavity 32 of the cartridge receiver as shown in FIG. 8(b), and so can be set there. The fuel cartridge constructed as in FIG. 5(a) can also engage with the concavity 33 as shown in FIG. 8(c), and so can be set there.

Figure 9A:
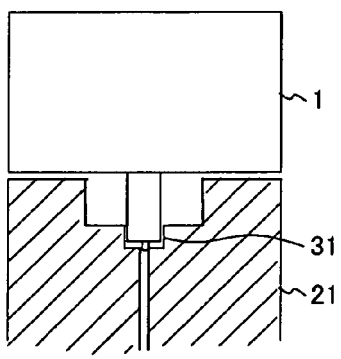
FIGS. 9a, 9b and 9c Side sectional views of the fuel cartridge set on the cartridge receiver shown in FIG. 7(b).
Figure 9B:
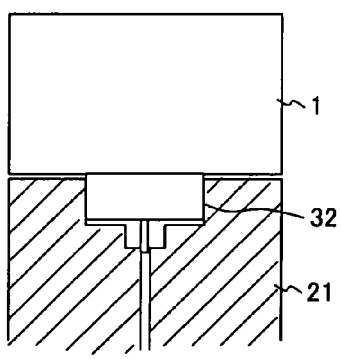
Figure 9C:
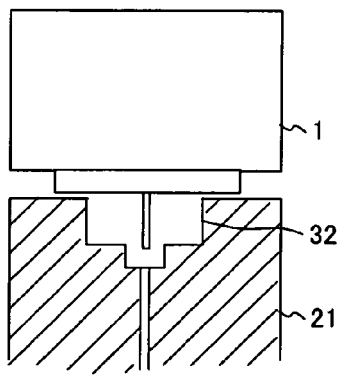

How the fuel cartridge shown in FIG. 5(a) to (c) is set on the cartridge receiver constructed as in FIG. 7(b) is explained hereunder, using FIG. 9(a) to (c). The cartridge receiver 21 shown in FIG. 7(b) is so constructed as to be applicable to fuel cartridges of low and intermediate concentration of methanol. The low concentration fuel cartridge constructed as in FIG. 5(c) can engage with the center concavity 31 of the cartridge receiver as shown in FIG. 9(a), and so can be set there. The fuel cartridge constructed as in FIG. 5(b) can also engage with the concavity 32 of the cartridge receiver as shown in FIG. 9(b), and so can be set there. The fuel cartridge constructed as in FIG. 5(a) cannot engage with the concavity as shown in FIG. 9(c), and so cannot be set there.

Figure 10A:
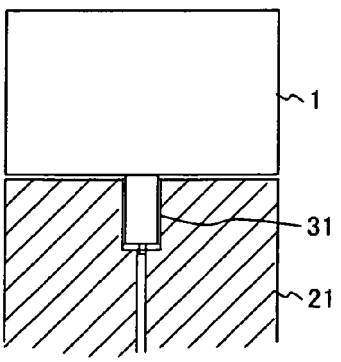
FIGS. 10a, 10b and 10c Side sectional views of the fuel cartridge set on the cartridge receiver shown in FIG. 7(c).
Figure 10B:
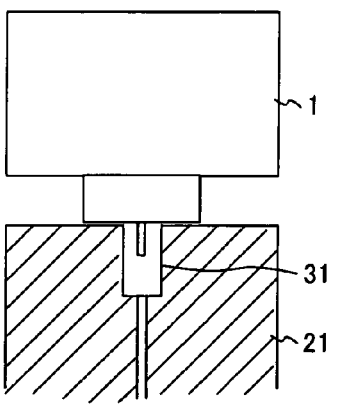
Figure 10C:
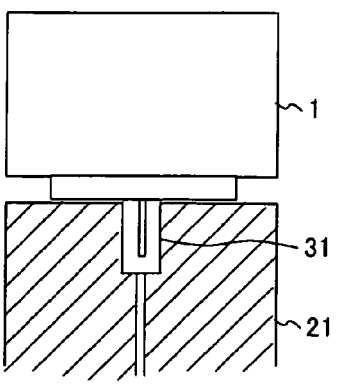

How the fuel cartridge shown in FIG. 5(a) to (c) is set on the cartridge receiver constructed as in FIG. 7(c) is explained hereunder, using FIG. 10(a) to (c). The cartridge receiver 21 shown in FIG. 7(c) is so constructed that only a fuel cartridge of low concentration of methanol can be set. The low concentration fuel cartridge constructed as in FIG. 5(c) can engage with the concavity 31 of the cartridge receiver as shown in FIG. 10(a), and so can be set there. The fuel cartridges constructed as in FIG. 5(b) and FIG. 5(a) can not engage with the concavity as shown in FIGS. 9(b) and (c), and so cannot be set there.

Generally, the concentration of methanol of the direct methanol fuel cell has an allowable range and, for a fuel cell that achieves high output when high concentration fuel is supplied, fuel with intermediate concentration and low concentration can also be supplied in most cases. On the other hand, in case of a fuel cell that achieves high output when intermediate or low concentration fuel is supplied, required output cannot be achieved if lower concentration fuel is supplied, possibly resulting in damage to devices. Judging from this, an idea of making the projection narrow in case the concentration of methanol of the fuel to be contained is low and increasing the width of the projection as the concentration becomes higher is very much effective. High concentration in the description above means that the concentration of methanol is for example 80% or more, intermediate concentration means the density of methanol is 40 to 60%, and low concentration means the concentration of methanol is 30% or less, but they are not limited thereto.

EMBODIMENT 2

A fuel cartridge and a cartridge receiver of fuel cell according to the second embodiment of the present invention are described hereunder, using FIG. 11 to FIG. 14. The same parts/component as in FIG. 1 to FIG. 10 is given the same symbol, and no further explanation is made.

Figure 11A:
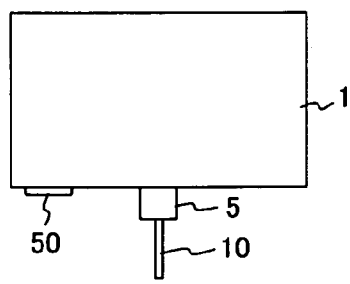
FIGS. 11a, 11b and 11c Side views of the fuel cartridge according to the second embodiment of the present invention.
Figure 11B:
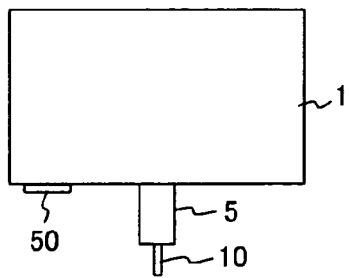
Figure 11C:
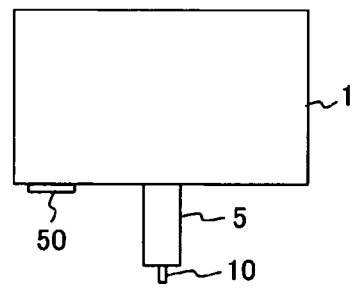

FIG. 11(a) to (c) is a side view of the fuel cartridge 1. In this embodiment, the fuel cartridge is provided with an electric contact 50 additionally to the Embodiment 1. FIG. 11(a) is a fuel cartridge for low density, of which projection 5 is made shorter. FIG. 11(b) is a fuel cartridge for intermediate density, of which projection 5 is made a littler longer than the one in FIG. 11(a). FIG. 11(c) is a fuel cartridge for high density, of which projection 5 is made much longer than the one in FIG. 11(b). The width of the projection is the same in all FIG. 11(a) to (c). In addition, the length from the end of the fuel cartridge to the tip of the fuel injection nozzle, that is, the total length of the projection and fuel injection nozzle is the same in all FIG. 11(a) to (c).

Figure 12A:
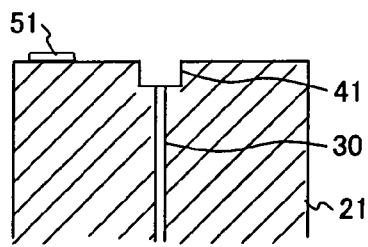
FIGS. 12a, 12b and 12c Side sectional views of the cartridge receiver according to the second embodiment of the present invention.
Figure 12B:
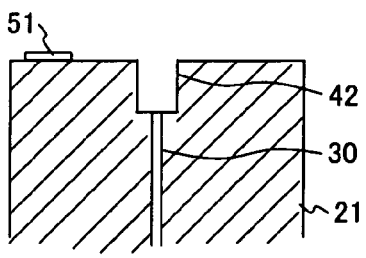
Figure 12C:
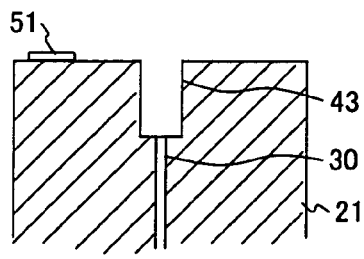

FIG. 12(a) to (c) shows the construction of the cartridge receiver 21 of the fuel cell on which the fuel cartridge shown in FIG. 11 is set. The cartridge receiver 21 is provided with an electric contact 51 at a position opposed to the electric contact 50 on the fuel cartridge. In addition, concavities 41, 42 and 43 are provided at a position the projection 5 of the fuel cartridge engages with. The cartridge receiver in FIG. 12(a) is provided with the concavity 41 having the same depth as the length of the projection of the fuel cartridge shown in FIG. 11(a) and the same width as the projection 5. The cartridge receiver in FIG. 12(b) is provided with the concavity 42 having the same depth as the length of the projection of the fuel cartridge shown in FIG. 11(b) and the same width. The cartridge receiver in FIG. 12(c) is provided with the concavity 43 having the same depth as the length of the projection of the fuel cartridge shown in FIG. 11(c) and the same width.

Figure 13A:
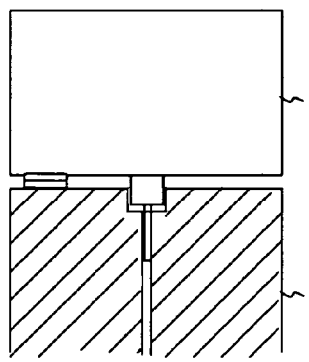
FIGS. 13a, 13b and 13c Side sectional views of the fuel cartridge set on the cartridge receiver shown in FIG. 12(a).
Figure 13B:
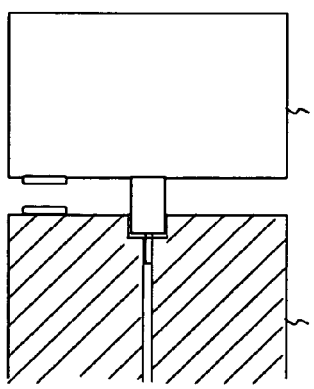
Figure 13C:
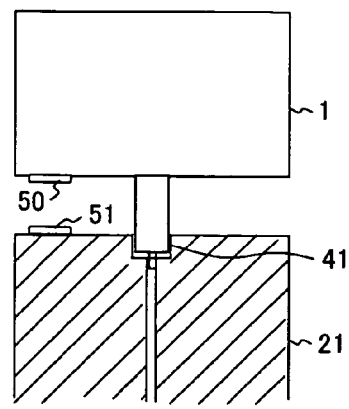

How the fuel cartridge constructed as in FIG. 11(a) to (c) is set on the cartridge receiver constructed as in FIG. 12(a) is explained hereunder, using FIG. 13(a) to (c). The depth and width of the concavity 41 of the cartridge receiver 21 shown in FIG. 12(a) are the same as the length and width of the projection 5 of the fuel cartridge shown in FIG. 11(a). Accordingly, the projection of the fuel cartridge constructed as in FIG. 11(a) engages with the concavity 41 as shown in FIG. 13 (a). In addition, when the above engagement is complete, the electric contact 50 gets in touch with the electric contact 51 and becomes electrically connected, and accordingly the fuel contained in the fuel cartridge flows towards the fuel cell. Because the length of the projection of the fuel cartridge constructed as in FIG. 11(b) is longer than the depth of the concavity 41, only part of the projection can engage with the concavity 41 and accordingly the two electric contacts would not get in touch with each other. The fuel in the fuel cartridge, therefore, is not supplied to the fuel cell. The above applies also to the fuel cartridge constructed as in FIG. 11(c), and accordingly the two electric contacts would not get in touch with each other and the fuel is not supplied to the fuel cell. In other words, it is only the fuel cartridge for low concentration fuel shown in FIG. 11(a) that can be set on the cartridge receiver constructed as in FIG. 12(a).

Figure 14A:
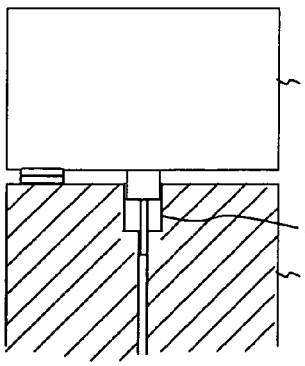
FIGS. 14a, 14b and 14c Side sectional views of the fuel cartridge set on the cartridge receiver shown in FIG. 12(b).
Figure 14B:
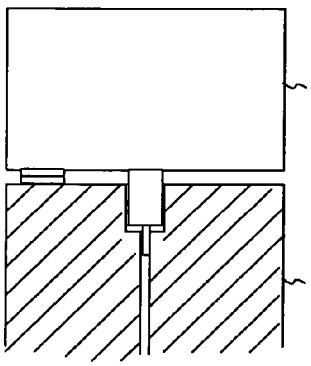
Figure 14C:
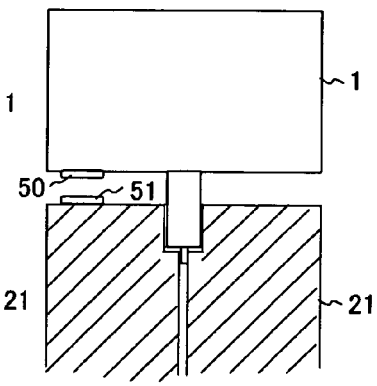

How the fuel cartridge constructed as in FIG. 11(a) to (c) is set on the cartridge receiver constructed as in FIG. 12(b) is explained hereunder, using FIG. 14(a) to (c). The depth of the concavity 42 of the cartridge receiver 21 shown in FIG. 12(b) is the same as the length of the projection 5 of the fuel cartridge shown in FIG. 11(b) and deeper than the length of the projection 5 of the fuel cartridge shown in FIG. 11(a). Accordingly, the projection 5 of the cartridge constructed as in FIG. 11(a) and cartridge constructed as in FIG. 11(b) engages with the concavity 42 and the electric contact 50 gets in touch with the electric contact 51 and becomes electrically connected as shown in FIGS. 14(a) and (b), and so the fuel in the fuel cartridge flow towards the fuel cell. Because the projection 5 of the fuel cartridge constructed as in FIG. 11(c) cannot engage with the concavity 42 as shown in FIG. 14(c), the fuel in the fuel cartridge cannot be supplied to the fuel cell. That is to say, the low concentration and intermediate concentration fuel cartridges shown in FIGS. 11(a) and (b) can be set on the cartridge receiver constructed as in FIG. 12(b).

Figure 15A:
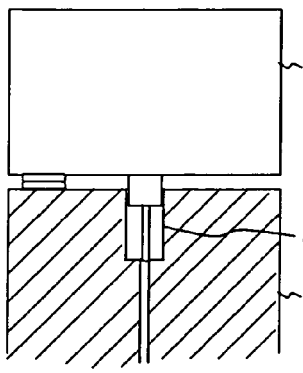
FIGS. 15a, 15b and 15c Side sectional views of the fuel cartridge set on the cartridge receiver shown in FIG. 12(c).
Figure 15B:
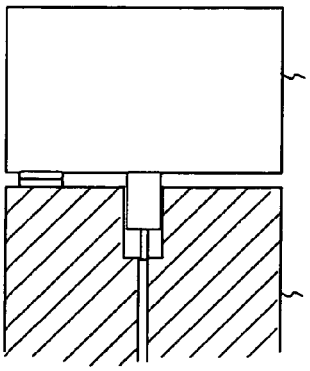
Figure 15C:
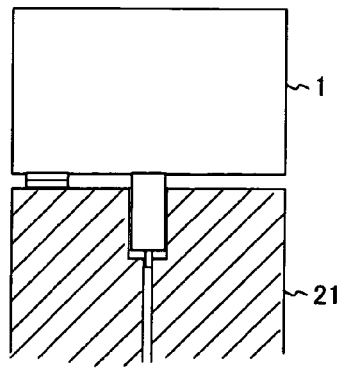

How the fuel cartridge constructed as in FIG. 11(a) to (c) is set on the cartridge receiver constructed as in FIG. 12(c) is explained hereunder, using FIG. 15(a) to (c). The depth of the concavity 43 of the cartridge receiver 21 shown in FIG. 12(c) is the same as the length of the projection 5 of the fuel cartridge shown in FIG. 11(c) and deeper than the length of the projection 5 of the fuel cartridges shown in FIGS. 11(a) and (b). Accordingly, any one of the cartridges in FIG. 11(a) to (c) can be set and the two electric contacts contact with each other as shown in FIGS. 15(a), (b) and (c).

The present invention is applicable to a direct methanol type fuel cell. According to the present invention, it is possible to supply fuel to a fuel cell when the concentration of methanol in the methanol mixed solution fuel contained in the fuel cartridge is proper for the fuel cell and not to supply fuel to the fuel cell when the fuel contained in the fuel cartridge is not proper for the fuel cell.

What is claimed is:

1. A fuel cell device comprising a fuel cell cartridge having a container for containing methanol mixed solution fuel and a direct methanol fuel cell on which the fuel cartridge is set;

the fuel cell cartridge being provided with a fuel injection nozzle on part of the container and a projection, having a predetermined diameter or length representing a concentration of methanol in the fuel, disposed around the fuel injection nozzle; and the direct methanol fuel cell being provided with a fuel cartridge receiver having a through-hole to be communicated with the fuel injection nozzle for introducing the fuel into the fuel cell and having a concavity with steps having different depths and diameters in concentric relation with the through-hole wherein the projection is engaged with one of the steps.

2. The fuel cell device according to claim 1, wherein the width and length of the projection of the fuel cartridge differ by the concentration of methanol, wherein when the concentration is low, the width is narrow and the length is long, and, and when the concentration is high, the width is wide and the length is short.

3. The fuel cell device according to claim 1, wherein the concavity of the fuel cell has a stepped depth, deepest at the center and shallower on outer steps, so that is to be applicable to multiple fuel cartridges having the projections of different widths and lengths.

* * * * *